US012557782B2

(12) United States Patent　　　(10) Patent No.: US 12,557,782 B2
Martin　　　　　　　　　　　　　　(45) Date of Patent: Feb. 24, 2026

(54) SYSTEM AND METHOD FOR DISTRIBUTING FEED TO PRESELECTED RECIPIENTS THEREOF

(71) Applicant: Uddermatic Inc., Mildmay (CA)

(72) Inventor: Lester Martin, Mildmay (CA)

(73) Assignee: Uddermatic Inc., Mildmay (CA)

( * ) Notice: Subject to any disclaimer, the term of this patent is extended or adjusted under 35 U.S.C. 154(b) by 279 days.

(21) Appl. No.: 18/295,112

(22) Filed: Apr. 3, 2023

(65) Prior Publication Data

US 2024/0324552 A1　　Oct. 3, 2024

(51) Int. Cl.
　*A01K 5/02*　　　(2006.01)
　*A01K 9/00*　　　(2006.01)
　*F24H 1/18*　　　(2022.01)

(52) U.S. Cl.
　CPC .......... *A01K 5/0275* (2013.01); *A01K 5/0216* (2013.01); *A01K 9/005* (2013.01); *F24H 1/185* (2013.01)

(58) Field of Classification Search
　CPC ..... A01K 5/0275; A01K 5/0216; A01K 9/005
　See application file for complete search history.

(56) References Cited

U.S. PATENT DOCUMENTS 2,710,593 A * 6/1955 Lippi ........................ A01K 9/00
　　　　　　　　　　　　　　　　　　　　119/71
4,149,491 A * 4/1979 Martin ..................... A01K 7/06
　　　　　　　　　　　　　　　　　　　　119/75

4,465,020 A * 8/1984 Schafer .................. A01K 7/027
　　　　　　　　　　　　　　　　　　　　119/73
5,355,833 A * 10/1994 Legrain .................... A01K 9/00
　　　　　　　　　　　　　　　　　　　　119/71
6,360,691 B1 * 3/2002 Laue ...................... B08B 9/0322
　　　　　　　　　　　　　　　　　　　　119/57.92

(Continued)

FOREIGN PATENT DOCUMENTS

CA　　　2816651 A1　12/2013
CN　　111919777 A * 11/2020
DE　　20314986 U1 * 3/2005 ........... A01K 5/0216

OTHER PUBLICATIONS

Translation of CN 111919777 (Year: 2020).*

(Continued)

*Primary Examiner* — Marisa V Conlon
(74) *Attorney, Agent, or Firm* — Gowling WLG (Canada) LLP

(57)　　　　　ABSTRACT

A system for distributing a plurality of predetermined amounts of predetermined feeds including at least one feed component to preselected recipients thereof at a plurality of respective feed locations. The system includes a track assembly with a track and a feeder assembly movable along the track. The feeder assembly includes a mixer subassembly for preparing a preselected one or more of the feed components together to provide the predetermined amounts of the predetermined feeds, and a dispensing subassembly, configured to receive the predetermined feeds from the mixer subassembly and to provide the predetermined feeds to the preselected recipients thereof. The system also includes a feeder mounting assembly, for mounting the feeder assembly to the track, and a motion assembly for moving the feeder assembly along the track.

6 Claims, 15 Drawing Sheets

(56)         References Cited

U.S. PATENT DOCUMENTS

| | | | |
|---|---|---|---|
| 7,481,181 B2 * | 1/2009 | Arnerup | A01K 7/022 |
| | | | 119/71 |
| 8,936,389 B2 * | 1/2015 | Bachman | B01F 33/85 |
| | | | 366/141 |
| 9,095,119 B2 | 8/2015 | Foerster | |
| 2004/0083980 A1 * | 5/2004 | Harding | A01K 5/0275 |
| | | | 119/60 |

OTHER PUBLICATIONS

Translation of 20314986 (Year: 2005).*
DE 19823783 and English translation (Year: 1999).*
KR 20220104391 and English translation (Year: 2022).*
DE 10252980 and English translation (Year: 2004).*

\* cited by examiner

SYSTEM AND METHOD FOR DISTRIBUTING FEED TO PRESELECTED RECIPIENTS THEREOF

FIELD OF THE INVENTION

The present invention is a system and a method for distributing feed to preselected recipients thereof.

BACKGROUND OF THE INVENTION

In the prior art, the task of providing animals, especially young animals, with a suitable feed mixture is generally done manually. Typically, the feed is tailored to a particular animal, to address that animal's specific needs. For example, a very young calf would have nutritional requirements that differ from the nutritional requirements of a calf that is three weeks old. However, conventional devices intended to automate the process have a number of defects or deficiencies.

SUMMARY OF THE INVENTION

For the foregoing reasons, there is a need for a system and a method for distributing feed to preselected recipients thereof that overcomes or mitigates one or more of the defects or deficiencies of the prior art.

In its broad aspect, the invention provides a system for distributing a number of predetermined amounts of predetermined feeds including one or more feed components to preselected recipients thereof at a number of respective feed locations. The system includes a track assembly with a track and a feeder assembly movable along the track. The feeder assembly includes a mixer subassembly for preparing a preselected one or more of the feed components together to provide the predetermined amounts of the predetermined feeds, and a dispensing subassembly, configured to receive the predetermined feeds from the mixer subassembly and to provide the predetermined feeds to the preselected recipients thereof. The system also includes a feeder mounting assembly, for mounting the feeder assembly to the track, and a motion assembly for moving the feeder assembly along the track.

BRIEF DESCRIPTION OF THE DRAWINGS

The invention will be better understood with reference to the attached drawings, in which.

DETAILED DESCRIPTION

Figure 1A:
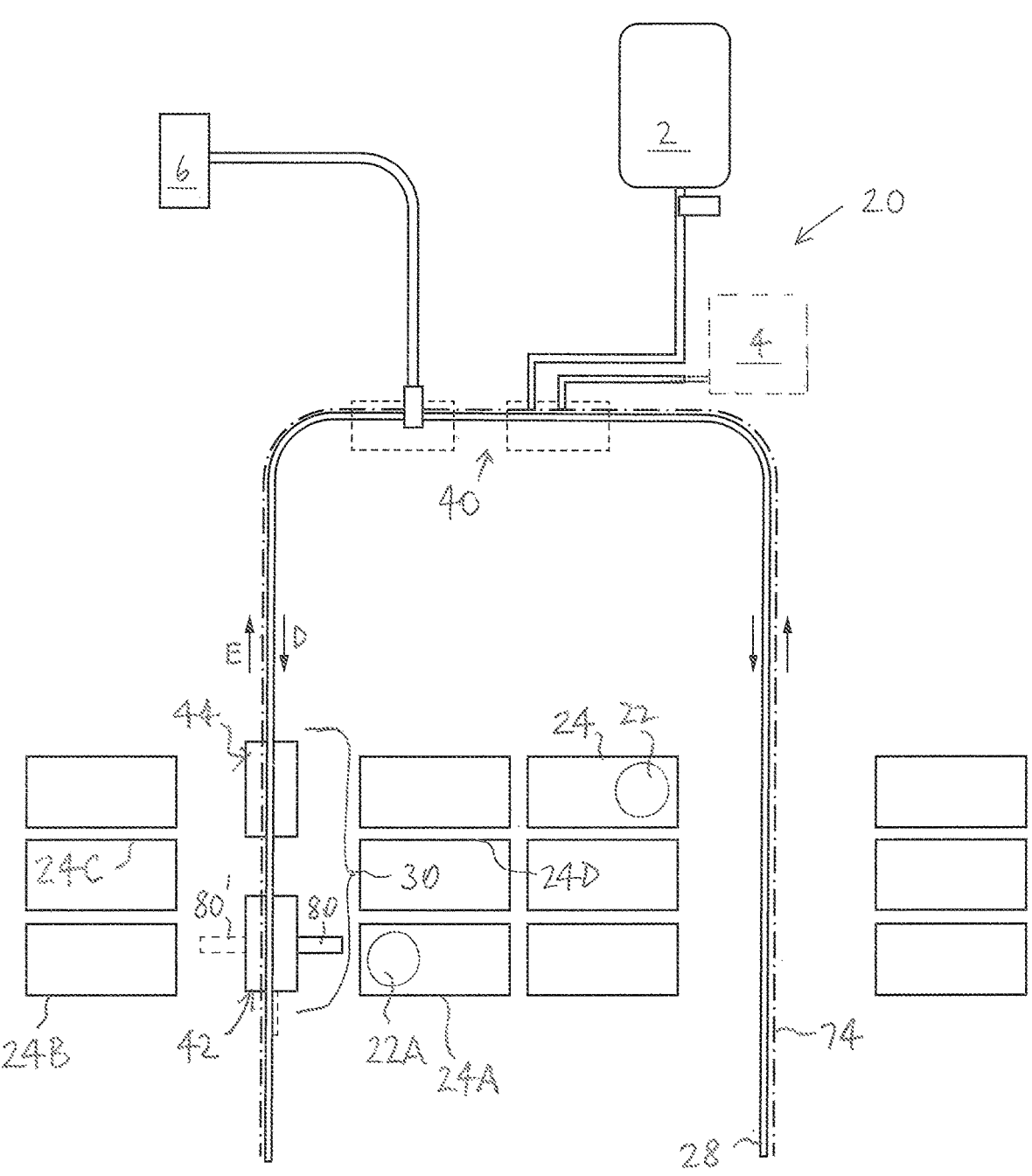
FIG. 1A is a schematic illustration of an embodiment of the system in which a feeder assembly is located at a feeding location.

In the attached drawings, like reference numerals designate corresponding elements throughout. Reference is first made to FIGS. 1A-5 to describe an embodiment of a system in accordance with the invention indicated generally by the numeral 20.

As will be described, the system 20 is for distributing a plurality of predetermined amounts of predetermined feeds including one or more feed components (not shown in FIGS. 1A-4B) to preselected recipients 22 thereof, at a plurality of respective feeding locations 24. In one embodiment, the system 20 preferably includes a track assembly 26 comprising a track 28 (FIG. 1C) and a feeder assembly 30 (FIG. 1A) movable along the track 28.

The feeder assembly 30 preferably includes a mixer subassembly 32 (FIG. 5A) for preparing a preselected one or more of the feed components together to provide the predetermined feeds. As will be described, the predetermined feed is prepared for a particular (preselected) recipient 22 or more than one preselected recipient 22, and has a specific composition accordingly. It is also preferred that the feeder assembly 30 includes a dispensing subassembly 34 (FIG. 5A), configured to receive the predetermined feeds from the mixer subassembly 32, and to provide the predetermined feeds to the preselected recipients 22 thereof.

Figure 5A:
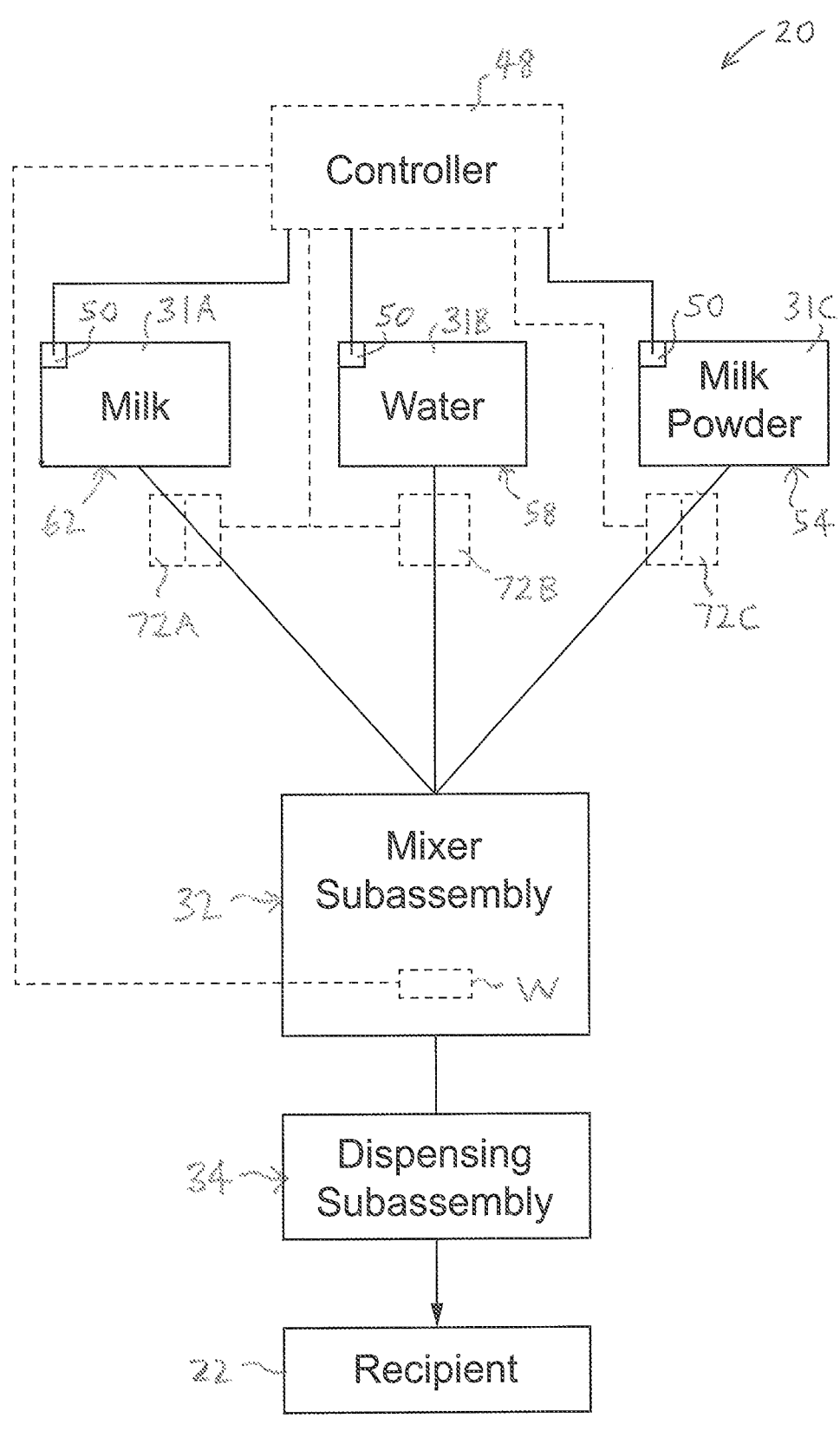
FIG. 5A is a block diagram illustrating an embodiment of the system of the invention.

The system 20 preferably also includes one or more tanks for holding the respective feed components. As will be described, each of the tanks is configured to be in fluid communication with the mixer subassembly 32 (FIG. 5A).

Figure 1B:
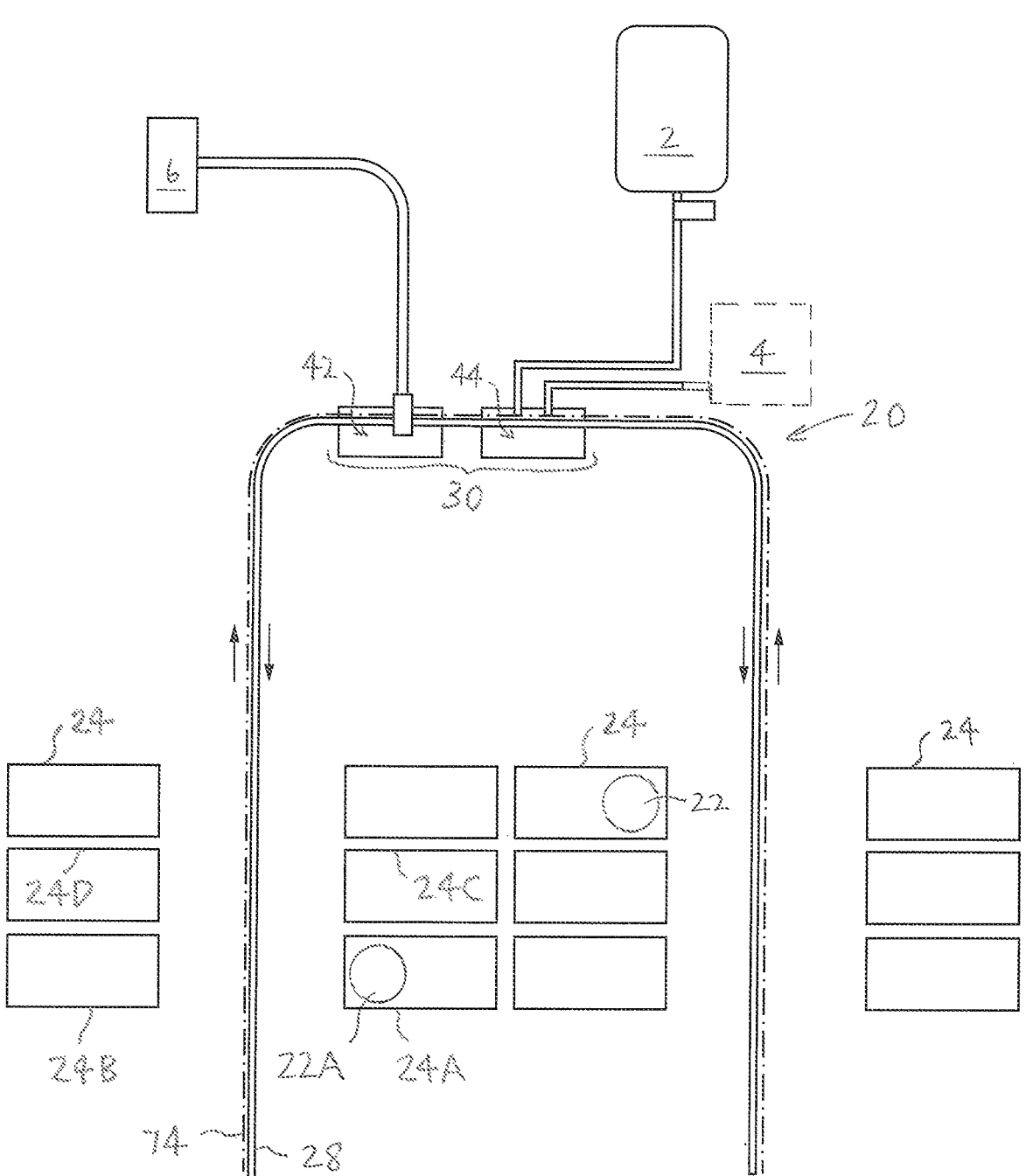
FIG. 1B is a schematic illustration of the system of FIG. 1A in which the feeder assembly is located at a home location.
Figure 1C:
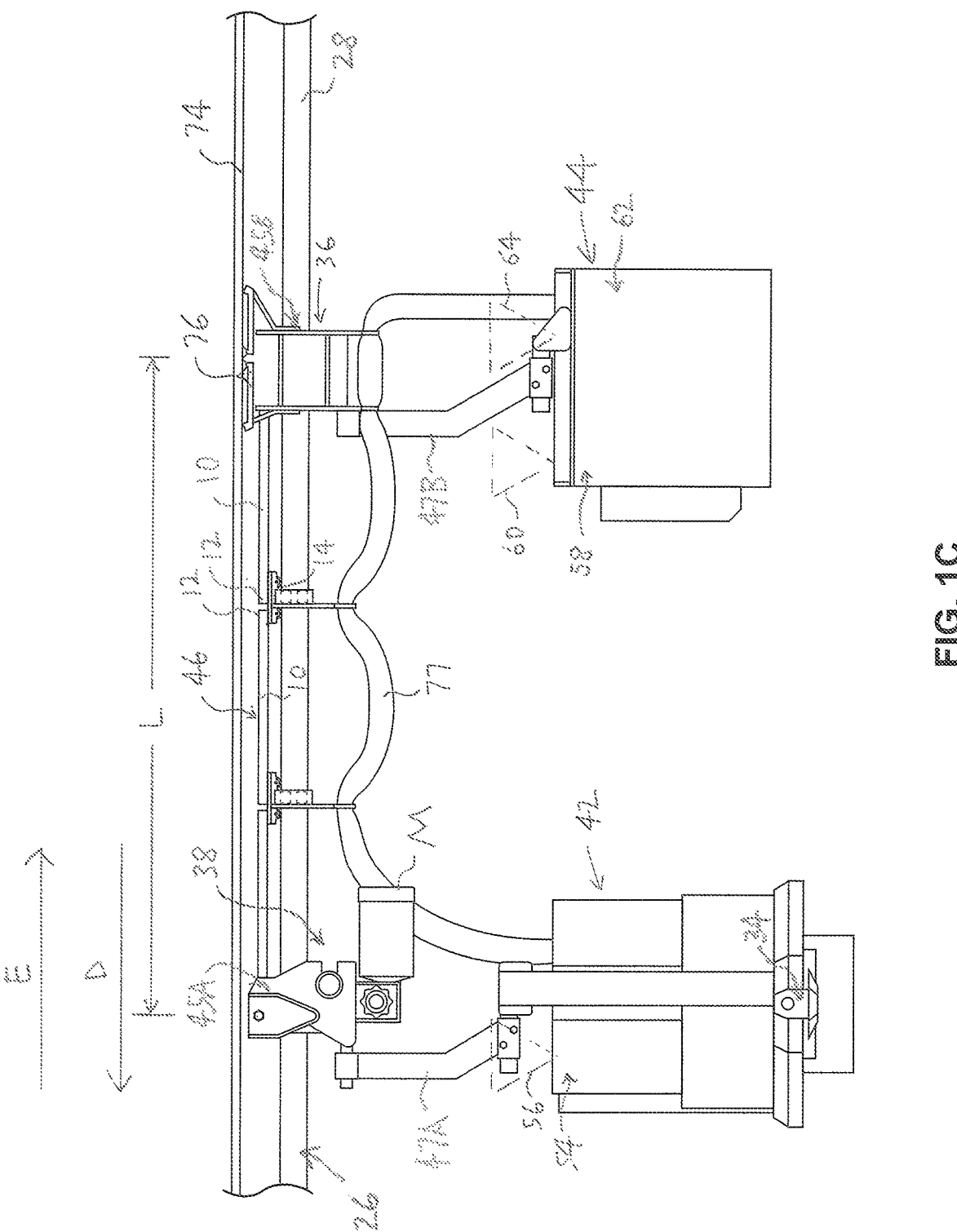
FIG. 1C is a side view of the system schematically illustrated in FIGS. 1A and 1B.

It is also preferred that the system 20 includes a feeder mounting assembly 36, for mounting the feeder assembly 30 to the track 28 (FIG. 1C). Preferably, the feeder assembly 30 is movable relative to the track 28. In one embodiment, the system 20 preferably also includes a motion assembly 38 (FIG. 1C), for moving the feeder assembly 30 along the track 28 between a home location 40 (FIG. 1B) at which the one or more tanks receive the one or more of the feed components respectively, and the respective feeding locations 24 (FIG. 1A). As will also be described, when the feeder assembly 30 is at a selected one of the feeding locations 24, the feeder assembly 30 provides the predetermined feed to the preselected recipient 11 that is at the feeding location 24.

Those skilled in the art would appreciate that the feeder assembly 30 may have any suitable structure. In the exemplary embodiments schematically illustrated in FIGS. 1A-1C, the feeder assembly 30 is shown as including a feeder unit 42 and a liquid storage unit 44. Preferably, the mixer subassembly 32 and the dispensing subassembly 34 are included in the feeder unit 42. As will be described, in one embodiment, the feeder unit 42 and the tank unit 44 preferably are linked to each other by a linkage assembly 46 (FIG. 1C), so that the feeder unit 42 and the tank unit 44 are moved together along the track 28 by the motion assembly 38.

As can be seen in FIG. 1C, in one embodiment, the feeder unit 42 and the liquid storage unit 44 preferably are mounted to the track 28 by respective mounting subassemblies 45A, 45B. The mounting subassembly 45A preferably includes the motion assembly 38, which includes a motor "M" and suitable gears (not shown) that engage the track 28, to move the feeding assembly 30 relative to the track 28. As can also be seen in FIG. 1C, the feeder unit 42 and the liquid storage unit 44 preferably are respectively connected to the mounting subassemblies 45A, 45B by arms 47A, 47B.

Those skilled in the art would appreciate that the feeder assembly 30, although illustrated in FIGS. 1A-1C as including two separate units (i.e., the feeder unit 42 and the liquid storage unit 44), may alternatively be provided in a single physical structure (not shown), or in any suitable number of structures. In practice, the two separate units 42, 44 are preferred because this arrangement of the elements of the feeder assembly 30 distributes the weight over a relatively long length "L" of the track 28 (FIG. 1C). Advantageously, because the feeder assembly 30 includes the two separate units 42, 44, the track 28 may include fewer supports than would be required, for example, if the feeder assembly 30 were included in a unitary structure.

It is preferred that the system 20 also includes a controller 48 (FIG. 5A) operatively connected with the feeder assembly 30 and the motion assembly 38, for controlling the mixer subassembly 32 to provide the predetermined feeds at the respective feeding locations 24 therefor. The controller 48 preferably includes one or more processors (not shown), with suitable software. The controller 48 is configured to control the feeder assembly 30 to provide the predetermined feed to the respective preselected recipients thereof at the respective feeding locations 24. It will be understood that the controller 48 may be in communication with remote devices via one or more networks.

The recipients of the feed may be, for example, animals (e.g., calves), and the feeding locations 24 may be conventional stalls or pens, which may be located in a facility inside a building (not shown), or in a facility located outside. In FIG. 1A, the feeder assembly 30 is shown in a position locating the feeder unit 42 at a selected feeding location that is identified in FIG. 1A by reference character 24A for clarity of illustration. It will be understood that, when the feeding assembly 30 is at the feeding location 24A, the feeder unit 42 is positioned for distributing or deploying a predetermined amount of a predetermined feed to an animal 22A that is positioned at the feeding location 24A (FIG. 1A). As will be described, in some circumstances, there may be more than one animal at a particular feeding location.

It will be understood that a number of other animals (not shown) are positioned at the other feeding locations 24 (FIGS. 1A, 1B).

From the foregoing, it can be seen that, as illustrated in FIG. 1A, the system 20 is configured to provide a predetermined amount of a predetermined feed to the preselected animal 22, at a preselected one of the feeding locations 24. It will be understood that, in this example, both the composition of the predetermined feed (i.e., the proportions of the feed components therein) and the amount thereof are specifically tailored to address the nutritional requirements of the preselected animal 22 in the feeding locations 24. Those skilled in the art would appreciate that the system 20 may utilize various devices to control the amount of the feed made available to a specific animal.

As will be described, the feeder assembly 30 preferably is moved from one feeding location 24 to the next in a feeding sequence that involves minimal movement of the feeder assembly 30.

Once the feeder unit 42 is in position to feed the animal(s) at a feeding location 24, the mixer subassembly 32 preferably prepares a batch of the predetermined feed for the preselected animal(s) at that feeding location 24. The batch that is prepared preferably is weighed before it is made available to the preselected animal(s), to determine whether the batch is the predetermined amount of feed. The prepared batch of the predetermined feed preferably is weighed by the weighing device "W", which is included in the mixer subassembly 32 (FIG. 5A).

If the batch is the predetermined amount (i.e., in the correct amount), then the dispensing subassembly 34 is moved into position at the next feeding location in the feeding sequence by the controller, and the feed is made available to the preselected animal(s) at the feeding location 24.

Figure 2A:
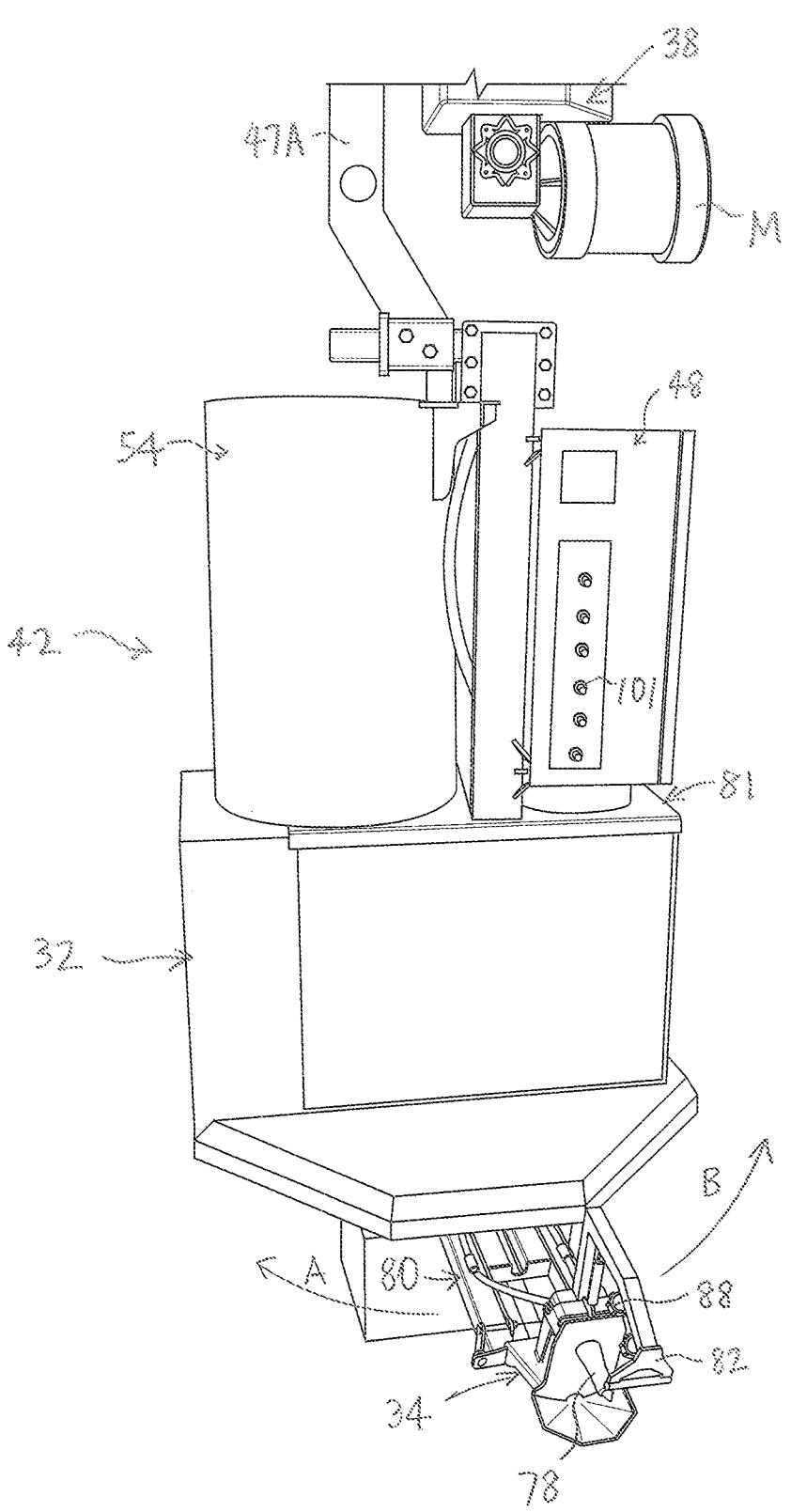
FIG. 2A is an isometric view of an embodiment of a feeder unit of the invention, drawn at a larger scale.
Figure 3:
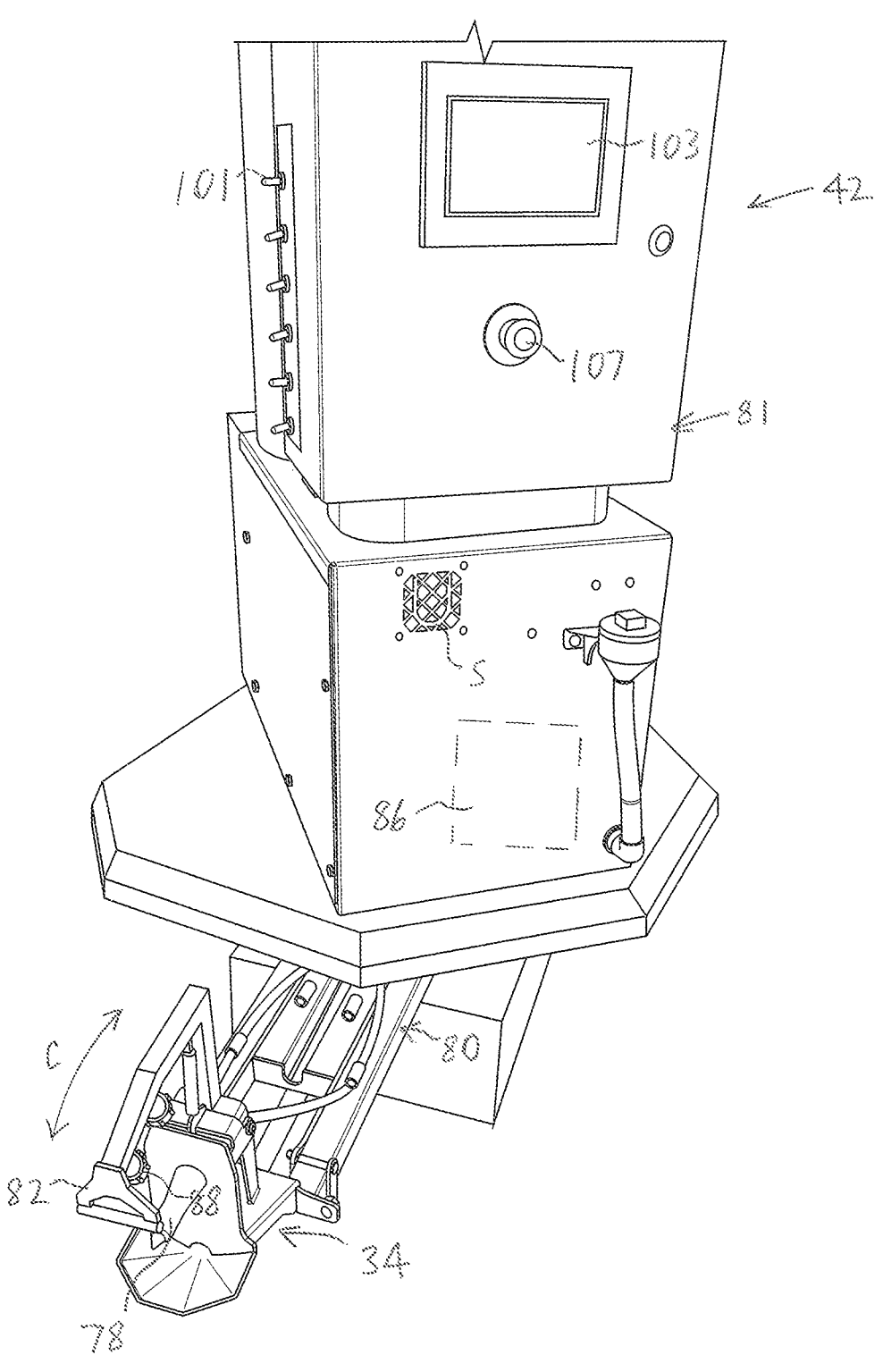
FIG. 3 is another isometric view of the feeder unit of FIGS. 2A and 2B, drawn at a smaller scale.

As will be described, the mixer subassembly 32 is in fluid communication with one or more nipple elements 78. The nipple element 78 preferably is mounted to a swing arm 80 (FIGS. 2A, 3). When the predetermined amount is ready (i.e., the predetermined feed is weighed by a weighing device "W" and determined by the controller 48 to be the predetermined amount), the swing arm 80 is caused by the controller 48 to be moved into position, to feed the preselected recipient. The feed then flows to the preselected recipient when the preselected recipient sucks on the nipple element 78.

The consumption of the feed by the animal(s) causes the amount of the feed at the weighing device "W" to decrease. When the feed in the weighing device "W" is less than preset amount (e.g., when the weight of the remaining feed is approximately zero), the feeder unit 42 ends the feeding session at that feeding location 24, and prepares to feed at the next feeding location 24 in the feeding sequence.

Those skilled in the art would appreciate that the controller 48 preferably is also configured to cause the feeder unit 42 to move on to the next feeding location 24 in the feeding sequence in circumstances where, for whatever reason, the animal at a feeding location has not consumed the predetermined amount of the predetermined feed. For example, the animal may be ill or deceased. In order to address these circumstances, the controller 48 preferably also includes a timer, which is activated when the feeder unit first makes the predetermined amount of the predetermined feed available to the preselected animal(s) at the feeding location 24. The controller 48 has a predetermined feed time period set for each of the preselected animals (or groups of animals) respectively at each feeding location 24.

If the preselected animal(s) at a particular feeding location 24 has not consumed all the predetermined feed therefor within the predetermined time period, then the controller 48 terminates the current feeding session. In this situation, the feeder unit 42 is moved to the next feeding location 24 in the feeding sequence.

Those skilled in the art would appreciate that the failure of an animal to consume the predetermined amount of the predetermined feed in the predetermined time period may be due to different reasons. As will be described, a feeding sequence report may be generated at any time, for instance, during a feeding sequence (e.g., upon the operator's request), or after the feeding sequence has ended. The report provides specific information to the operator that may be used thereby to identify and to address any problems or irregularities in connection with the manner in which the animals are feeding. Preferably, the operator may determine parameters of interest, and a time period of interest for a report. For instance, if the operator determines that an animal did not consume the correct amount of feed at a certain time and date, the operator may then obtain a report showing that animal's feed consumption over a specified time period, e.g., over the previous week, to enable the operator to find out more about the animal's condition.

As noted above, the animal 22A that is at the feeding location 24A is provided with the predetermined feed that the animal 22A requires. It will also be understood that other animals (not shown) at the other feeding locations 24 may have different nutritional requirements, and the predetermined feed distributed to those other animals 22 and the predetermined amounts thereof differ accordingly. The system 20 is configured to provide predetermined feeds having a variety of mixtures of the feed components in a range of predetermined amounts, tailored for the specific animal(s) located at each respective feeding location 24.

Those skilled in the art would appreciate that, where there is more than one animal located at a particular feeding location 24, all the animals at that feeding location receive the same predetermined feed. As a practical matter, therefore, where more than one animal is located at a particular feeding station, the animals located at the same feeding location 24 have the same (or substantially the same) nutritional requirements.

It will be understood that the controller 48 determines the composition and amount of the predetermined feed for a particular (preselected) animal 22 that is located at a particular feeding location 24. This determination may be based on data input by an operator (not shown). Based on information about the preselected animal and its current location, the controller 48 provides instructions to the feeder assembly 30 for mixing the feed components to provide a specific quantity of the predetermined feed for the preselected animal at the selected location 24. As will also be described, the controller 48 also causes the motion assembly 38 to position the feeder unit 42 at the selected feeding location 24, for dispensing the quantity of the predetermined feed to the preselected animal 22.

Those skilled in the art would also appreciate that, when one of the animals is moved, e.g., to a different feeding location 24, or out of the facility in which the system 20 is located, the controller 48 is reconfigured accordingly. For instance, an animal may be moved due to its age.

As can be seen in FIG. 5A, in one embodiment, the system 20 preferably includes a whole milk tank 31A, a water tank 31B, and a milk powder hopper or tank 31C. The feed components may include whole milk, water, and milk powder, which are respectively receivable in the whole milk tank 31A, the water tank 31B, and the milk powder hopper 31C. These three feed components are only examples. Those skilled in the art would appreciate that the feed components may include additional components, or they may instead include other components. In the following description, it is assumed for the purposes of the description that the feed components may include only whole milk, water, and whole milk powder.

For example, where the recipients 22 are calves, the predetermined feed may include only whole milk. Alternatively, the feed may include (i) whole milk, (ii) reconstituted milk that is formed by mixing the milk powder and the water together in predetermined proportions, as is known, or (iii) a mixture of whole milk and reconstituted milk.

It will be understood that the water is provided for two purposes. First, as noted above, the water may be mixed with milk powder, to form reconstituted milk that is included in the feed. Second, the water may be used to clean parts of the system 20, as will be described.

In one embodiment, the whole milk tank 31A and the water tank 31B preferably are positioned in the liquid storage unit 44. Also, the milk powder hopper 31C preferably is positioned in the feeder unit 42, as will be described.

As can be seen in FIG. 1C, the feeder unit 42 and the liquid storage unit preferably are connected by the linkage assembly 46. Preferably, the linkage assembly 46 includes a number of elongate link elements 10 that are connected to each other at their respective ends 12 for pivotal movement, by connectors 14. The links at the ends of the assembly 46 are pivotally connected with the mounting subassemblies 45A, 45B for pivotal movement.

When the motion assembly 38 causes the feeder unit 42 to move along the track 28 in the direction indicated by arrow "D" in FIG. 1C, the liquid storage unit 44 is pulled in the same direction, because the liquid storage unit 44 is connected to the feeder unit 42 by the linkage assembly 46. Similarly, when the motion assembly 38 moves the feeder unit 42 in the direction indicated by arrow "E", the liquid storage unit 44 is pushed by the linkage assembly 46 in the direction indicated by arrow "E".

In one embodiment, the system 20 preferably includes a plurality of sensors 50 located to provide selected data to the controller 48. For example, the controller 48 may determine, based on the sensors 50 in the tanks 31A, 31B, and the hopper 31C (FIG. 5A), when one or more of the tanks 31A, 31B, and the hopper 31C is to be refilled.

As described above, the controller 48 also controls the positioning of the feeder assembly 30. In order for the location of the feeder assembly 30 to be determinable by the controller 48, means for locating the feeder unit 42 and the liquid storage unit 44 relative to the feeding locations 24 and the home location 40 preferably are included in the system 20. Such means may be any suitable means.

For example, in one embodiment, a shaft encoder (not shown) may be mounted to a drive shaft of the motor "M". Those skilled in the art would appreciate that, with the shaft encoder, the controller 48 is provided with information about the location of the feeder unit 42 relative to the track 28, which is used by the controller 48 to position the feeder unit 42 at the respective feeding locations 24 in the feeding sequence.

It is preferred also that the motion assembly 38 is configured to move the feeder assembly 30 to the home location 40 after electrical power was unavailable to the feeder assembly 30 and is restored. If electrical power is not available, the feeder assembly 30 automatically ceases feeding. When electrical power is supplied again after the outage, the controller 48 causes the feeder assembly 30 to move to a stop at the home location 40. This enables the shaft encoder to reset, when electrical power is restored, so that the controller 48 may properly control the movement of the feeder assembly 30.

The controller 48 preferably is configured to activate the motion assembly 38 to move the feeder assembly 30 to the home location 40 when any one or more of the whole milk tank 31A, the water tank 32B and/or the milk powder hopper 31C requires refilling. Similarly, the controller 48 preferably is configured to activate the motion assembly 38 for movement of the feeder assembly 30 from the home location 40 to locate the feeder unit 42 at a selected feeding location 24 after the whole milk tank 31A, the water tank 31B and/or the milk powder hopper 31C have been respectively filled, at the home location 40.

It will be understood that, after the feeding assembly 30 is replenished at the home location with the feed components, the controller 48 preferably causes the feeder unit 42 to move from one feeding location 24 to the next, in the predetermined feeding sequence. For example, the controller 48 may cause the feeder unit 42 to begin a feeding sequence at the feeding location identified in FIG. 1A by reference character 24A. In this example, after providing the feed to the preselected animal(s) at the feeding location 24A, the feeder unit 42 may provide the feed for other preselected animals, e.g., the animal(s) positioned at the feeding location 24B (FIG. 1A).

It will also be understood that the feeding sequence may continue uninterrupted, as long as the tanks 31A-31C have sufficient quantities of the feed components therein. For instance, continuing the feeding sequence, after providing the feed to the preselected animal at the feeding location 24B, the feeder unit 42 is moved to the feeding location 24C. If the tanks 31A-31C do not at that time need to be refilled, then after dispensing the feed to the preselected animal at the feeding location 24C, the feed is dispensed to the preselected animal(s) at the feeding location 24D.

It will be understood that the controller 48 preferably controls the motion assembly 38 to cause the feeder unit 42 to be moved through the building or facility (i.e., inside a building, or outside) in which the system 20 is installed in a feeding sequence, from one feeding location to the next, that minimizes the movement of the feeder unit 42 along the track 28. (Because the feeder unit 42 and the liquid storage unit 44 are linked together, movement of the feeder unit 42 causes corresponding movement of the liquid storage unit 44.) The feeding sequence continues until it is interrupted or concluded, as the case may be. Also, when the progression of the feeder unit 42 through the feeding sequence is interrupted (e.g., because one or more of the tanks 31A-31C need to be refilled), the controller 48 is configured to cause the feeder unit 42 to recommence the feeding sequence at the point where the feeding sequence was interrupted.

The feeding sequence may be interrupted, for example, because one or more of the tanks 31A, 31B and/or the hopper 31C is sufficiently depleted that the one or more tanks 31A, 31B and/or the hopper 31C should be refilled, as noted above. When one or more of the tanks 31A, 31B and/or the hopper 31C is required to be refilled, one or more of the sensors 50 provides an appropriate signal to the controller 48, which then causes the motion assembly 38 to move the feeder assembly 30 to the home location 40. Preferably, after the one or more tanks 31A, 31B and/or the hopper 31C have been refilled with the feed components at the home location 40, the controller 48 causes the feeder assembly 30 to return to the feeding location 24 that is next in the feeding sequence, to recommence the feeding sequence at the point where it had been interrupted.

As noted above, the controller 48 preferably generates a feeding sequence report (not shown) after a feeding sequence is completed, in which the measures of all relevant parameters are provided, for the animals at the respective feeding locations 24. With the report, the operator can determine the status of the animals at all the feeding locations 24 respectively.

As also noted above, a report may be obtained at any time, regarding any parameters of interest. For instance, the operator may obtain a report while the feeding is underway. The report may provide up-to-the-minute information about any specific one or more animals.

Those skilled in the art would appreciate that the feed components may be directed into the tanks 31A, 31B, and the hopper 31C using any suitable means. As will be described, exemplary funnels are schematically illustrated in FIG. 1C.

For example, the milk powder hopper 31C preferably is included in a milk powder tank subassembly 54 in the feeder unit 42 that includes a milk powder funnel 56 for directing the milk powder into the milk powder tank 31C.

Preferably, the water tank 31B is included in a water tank subassembly 58 that includes a water funnel 60 for guiding the water into the water tank 31B. It is also preferred that the whole milk tank 31A is included in a whole milk tank subassembly 62 that includes a whole milk funnel 64 for guiding the whole milk into the whole milk tank. As can be seen in FIG. 1C, in one embodiment, the water tank subassembly 58 and the whole milk tank subassembly 62 preferably are mounted in the liquid storage unit 44.

When the feeder assembly 30 is located at the home location 40, the milk powder is directed into the milk powder hopper or tank 31C via the funnel 56 (FIG. 1C). Similarly, when the feeder assembly 30 is located at the home location 40, the water is guided into the water tank 31B by the funnel 60, and the whole milk is guided into the whole milk tank 31A by the whole milk funnel 64.

As can be seen in FIGS. 1A and 1B, the whole milk, the water, and the milk powder preferably are provided from a whole milk reservoir 2, a water source 4, and a milk powder reservoir or container 6 respectively. The water source 4 may be any suitable source. Preferably, the whole milk is stored in a suitable tank, suitably refrigerated, and the milk powder is stored in another suitable container. It will be understood that, when the feeding assembly 30 is positioned at the home location 40 (as illustrated in FIG. 1B), the feed components are directed from the respective reservoirs and/or sources 2, 4, 6 into the respective tanks 31A, 31B, and the hopper 31C.

As noted above, the predetermined feed may be provided to young animals, e.g., calves. The whole milk may need to be heated before distribution to the animals. Those skilled in the art would appreciate that the whole milk preferably is provided in the predetermined feed within a preselected temperature range that is above room temperature, and would be aware of suitable temperatures. For example, for calves, the whole milk preferably is provided at between approximately 37° C. and approximately 45° C. Accordingly, the whole milk in the whole milk tank 31A preferably is heated to a preselected temperature range.

It is also preferred that the water in the feed is heated to a predetermined temperature range.

The whole milk that is in the whole milk tank 31A may be maintained within the preselected temperature range therefor by any suitable means. For example, in one embodiment, the water tank subassembly 58 preferably includes one or more heating elements 66 therein (FIG. 4A), for heating the water in the water tank 31B to a predetermined temperature range.

Figure 4A:
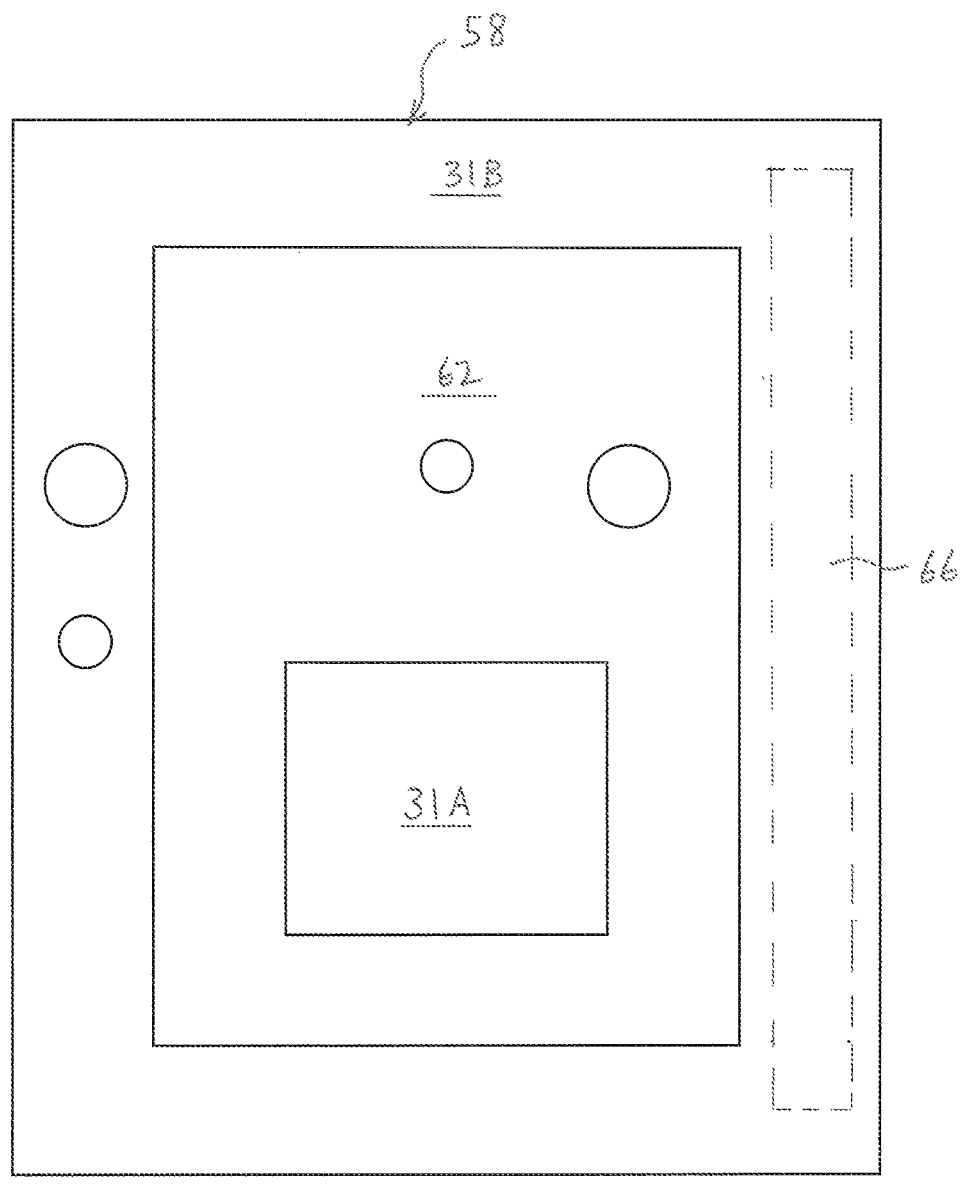
FIG. 4A is a schematic view of embodiments of whole milk and water tank subassemblies of the invention, drawn at a larger scale.

It will be understood that, for clarity of illustration, only one heating element 66 is schematically illustrated in FIG. 4A. It is preferred that heating elements are generally uniformly distributed in the water tank 31B.

The water in the water tank 31B may be heated to between approximately 37° C. and approximately 45° C., consistent with the preferred temperature range for the whole milk.

Preferably, the water tank 31B and the whole milk tank 31A are formed for heat transfer from the water in the water tank 31B to the whole milk in the whole milk tank 31A, to maintain the whole milk in the whole milk tank 31A at the preselected temperature range therefor.

As noted above, the predetermined feed may include only whole milk. Those skilled in the art would appreciate that the predetermined feed may instead consist of reconstituted milk (made by mixing milk powder with water), or a mixture of the reconstituted milk and the whole milk. Preferably, in order to provide the feed components in the preselected amounts to create the predetermined feed, predetermined amounts of the feed components are directed into the mixer subassembly 32. If the feed components are to be mixed together, then such feed components as are needed for the predetermined feed are mixed together in the mixer subassembly 32, to provide the predetermined feed for the one or more preselected animals at a preselected feeding location 24. However, as noted above, the predetermined feed may include only whole milk, and in that case, the whole milk is simply channeled through the mixer subassembly to the weighing device "W", without mixing thereof.

Figure 2B:
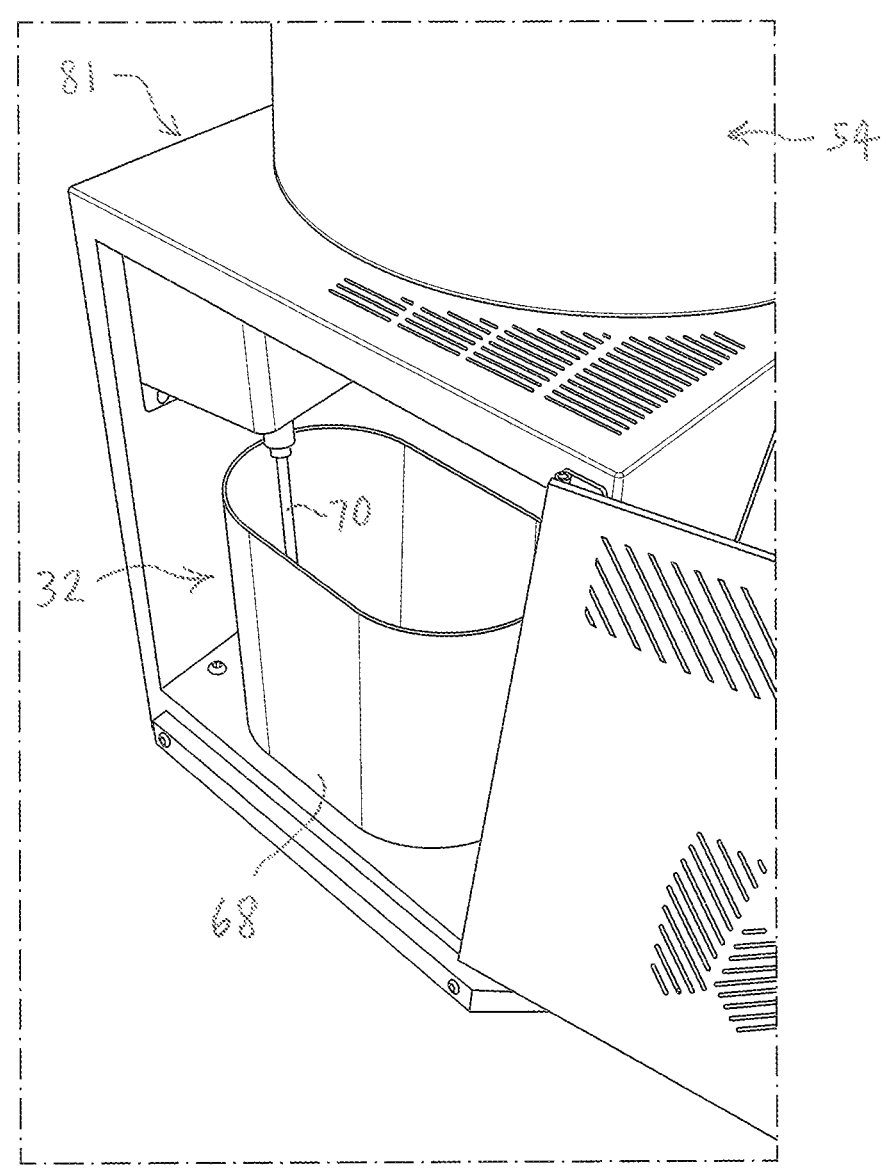
FIG. 2B is an isometric view of an embodiment of a mixer tank in the feeder unit of FIG. 2A, drawn at a larger scale.

As can be seen in FIG. 2B, the feeder unit 24 preferably includes the mixer subassembly 32, which preferably includes a mixing tank 68 and a mixing device 70, e.g., a whisk or beater element, for mixing the feed components (not shown) that are positioned in the mixing tank 68. The whisk or beater element 70 is rotatable by a motor (not shown) of the mixer subassembly 32.

It will be understood that, where the predetermined feed includes only the whole milk, then the whole milk is not mixed with any other feed component. In these circumstances, the correct amount of whole milk (i.e., the predetermined amount) is directed through the mixer subassembly 32 directly to the weighing device "W", at which the amount of whole milk is weighed. In these circumstances, the whole milk may bypass the mixing tank 68. The whole milk that is weighed at the weighing device "W" is in fluid communication with the nipple element 78. As described above, if the amount weighed is determined by the controller to be the predetermined amount, then the swing arm 80 is pivoted or swung to make the nipple element 78 available to the preselected recipient.

Preferably, each of the milk powder tank subassembly 54, the water tank subassembly 58, and the whole milk tank subassembly 62 includes a device respectively for controlling flow of the milk powder, the water, and the whole milk therefrom respectively to the mixer subassembly 32. The devices for controlling (i) the flow of the whole milk from the whole milk tank 31A, (ii) the flow of the water from the water tank 31B, and (iii) the flow of the milk powder from the milk powder hopper 31C are identified in FIG. 5A by reference characters 72A, 72B, and 72C respectively. The devices 72A-72C are controlled by the controller 48, in order to provide the feed components (in the example given, the whole milk, the water, and the milk powder) to the mixer subassembly 32 in the proportions needed for the predetermined feed for the preselected recipient 22.

Preferably, the whole milk that is released from the whole milk tank 31A is pumped by a pump therefor (not shown) to the mixer subassembly 32. As described above, if the predetermined feed includes only whole milk, then the whole milk is sent directly to the weighing device "W". However, if the predetermined feed includes both whole milk and reconstituted milk, then the whole milk, the milk powder, and the water preferably are directed to the mixing tank 68, in the appropriate proportions. Similarly, the water that is released from the water tank 31B is pumped by a pump (not shown) to the mixing tank 68. The whole milk pump and the water pump are controlled by the controller 48. The device 72C is also controlled by the controller 48 to allow a predetermined amount of the milk powder to be released from the hopper 31C, as will be described.

The devices 72A-72C may be any suitable devices, controlled by the controller 48. For example, devices 72A, 72B may be any suitable valves. Similarly, the device 72C may be any device suitable for controlling the flow of the milk powder from the milk powder hopper 31C. In one embodiment, for example, the milk powder may be released by the device 72C and allowed to fall into the mixing tank 68 under the influence of gravity.

In summary, the mixing device 70 is positioned in the mixing tank 68 for mixing selected ones of the feed components together in the predetermined ratios thereof, to provide the predetermined feed.

The system 20 preferably is powered by electrical energy. Those skilled in the art would appreciate that the electrical energy may be provided by any suitable connection or means for connection. Preferably, the system 20 includes one or more bus bars 74, for providing electrical energy to the feeder assembly 30 and to the motion assembly 38. The system 20 includes one or more electrical connector subassemblies 76 (e.g., a pantograph), for electrically connecting the bus bar 74 with the feeder assembly 30 and the motion assembly 38 (FIG. 1C).

As can be seen in FIG. 1C, in one embodiment, whole milk and water is pumped through a number of flexible tubes (not shown) inside a casing 77 that extends between the liquid storage unit 44 and the feeder unit 42, at which the whole milk and the water is directed into the mixing tank 68. It will be understood that electrical energy is provided to the feeder unit 42 from the bus bar 74 via the connector subassemblies 76 and via suitable conductors (not shown) that are also located inside the casing 77.

Figure 5B:
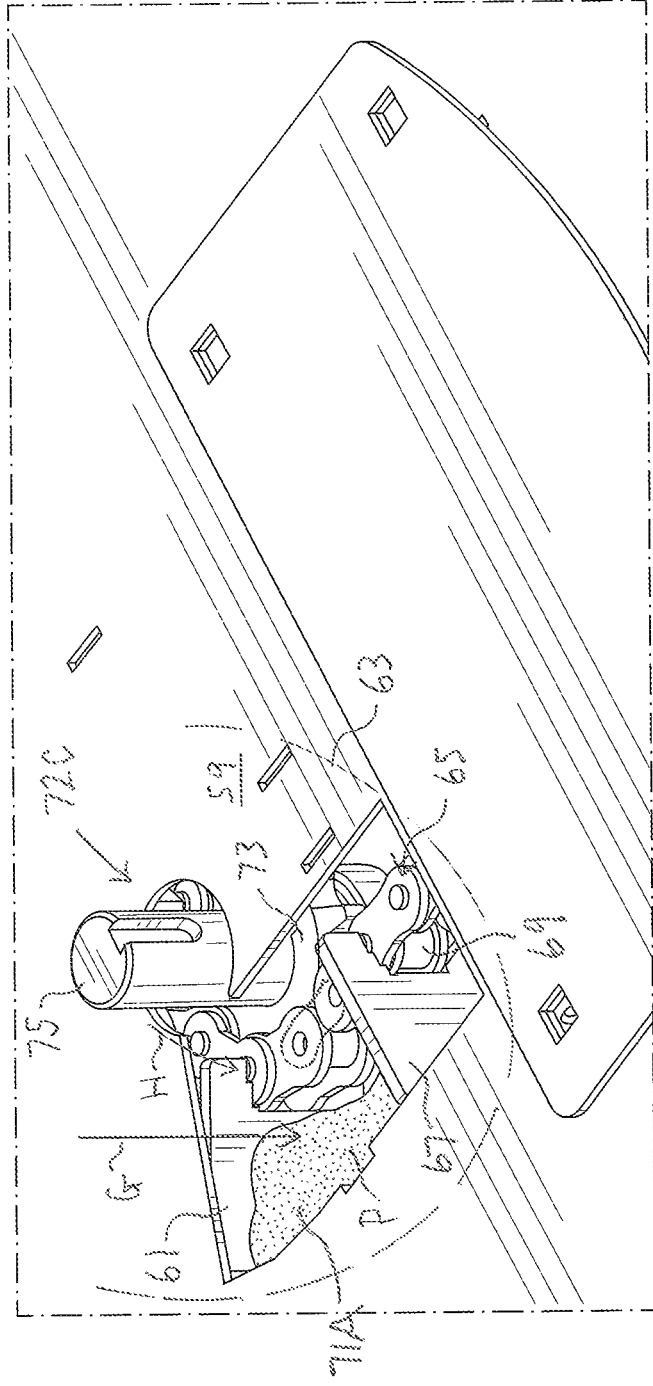
FIG. 5B is an isometric view of a device including a modified chain subassembly for controlling the flow of milk powder from a milk powder hopper.

An embodiment of the device 72C is illustrated in FIG. 5B. Preferably, a panel 59 is positioned beneath the hopper 31C (not shown in FIG. 5B), and the panel 59 has an opening 61 therein that is directly below the hopper 31C. A lower end of the hopper 31C is generally indicated by dashed lines in FIG. 5B, identified by reference character 63. It will be understood that the lower end of the hopper 31C is open, and is directly above and vertically aligned with the opening 61. The lower end opening (not shown) of the hopper 31C preferably is approximately the same size as the opening 61, or slightly smaller than the opening 61.

Figure 5C:
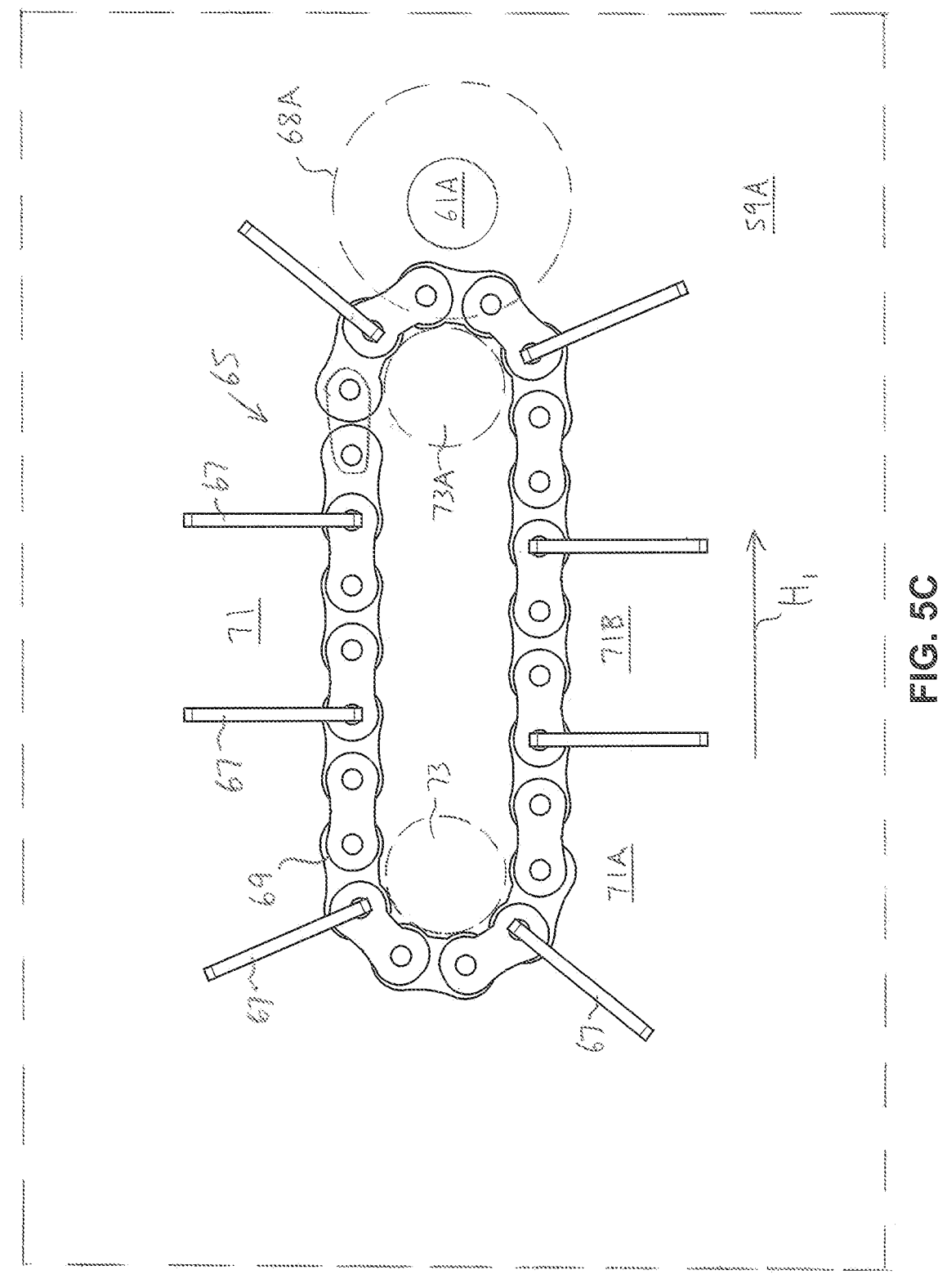
FIG. 5C is a side view of the modified chain subassembly of FIG. 5B.
Figure 6:
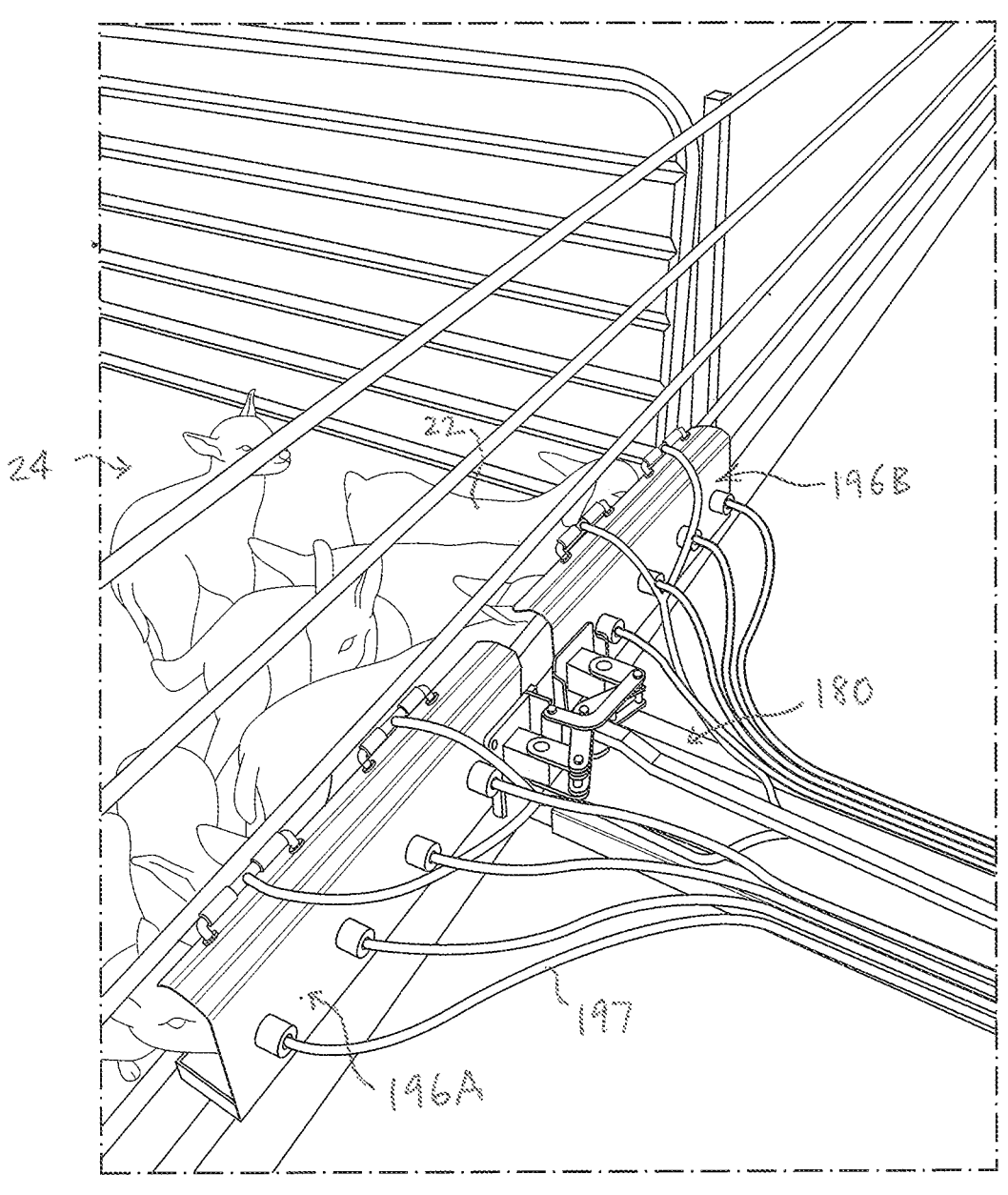
FIG. 6 is an isometric view of an embodiment of a feeder bar subassembly of the invention, positioned to dispense feed to a number of animals, drawn at a smaller scale.

As shown in FIG. 5B, the milk powder "P" is allowed to fall into the opening 61, as indicated by arrow "G", under the influence of gravity. A chain subassembly 65 that includes plates 67 mounted to a chain 69 (FIG. 5C) is partially positioned in the opening 61. The plates 67 are spaced apart along the length of the chain 69 (FIG. 5C). As can be seen in FIGS. 5B and 5C, the plates 67 define compartments 71 therebetween. When the powder "P" falls into the opening 61, the powder "P" is located in a compartment 71 that is positioned below the opening 61. As will be described, the chain subassembly 65 is moved by two sprockets.

It will be understood that another panel 59A (FIG. 5C) is positioned below the chain subassembly 65, to provide a floor along which the plates 67 may push the powder "P" when the chain subassembly 65 is moved. The chain subassembly 65 is positioned horizontally (or substantially horizontally), located between the panel 59 and the lower panel or floor 59A. It will be understood that the chain subassembly 65 travels through a channel (not shown) that is mounted to the lower panel 59A.

For clarity of illustration, the specific compartment in which the powder "P" is shown in FIG. 5B is identified by reference character 71A.

Preferably, the chain subassembly 65 is mounted to a sprocket 73 that is rotated by an axle 75 on which the sprocket 73 is mounted (FIG. 5B). In the example illustrated in FIG. 5B, the sprocket 73 is rotatable in the direction indicated by arrow "H". It will be understood that the chain subassembly 65 is mounted to a second sprocket 73A schematically illustrated in FIG. 5C. The sprocket 73 is also schematically illustrated in FIG. 5C, for clarity of illustration. The second sprocket 73A is positioned so that the chain subassembly 65 engages the second sprocket 73A, to cause the chain subassembly 65 to be moved laterally in the direction indicated by arrow "$H_1$" between the panel 59 and the floor, as the sprockets rotate. It will be understood that the axle 75 is rotated by a suitable motor (not shown) included in the device 72C, the motor being controlled by the controller 48, so that the sprockets 73, 73A are rotated when the motor is energized due to an appropriate signal received by the motor from the controller 48.

The chain subassembly 65 is illustrated in FIG. 5C. As can be seen in FIG. 5C, the compartment 71A, and the powder "P" therein (not shown in FIG. 5C) is moved in the direction indicated by arrow "$H_1$" when the sprockets rotate. Preferably, the floor 59A has an opening 61A therein that is vertically aligned with the mixing tank 68. In FIG. 5C, the dashed line identified by reference character 68A generally indicates the location of the mixing tank 68, below the floor 59A.

As can be seen in FIG. 5C, when the motor connected with the axle 75 rotates the axle 75, the plates 67 defining compartment 71A (and the powder "P" that is positioned in the compartment 71A) are moved laterally to the opening 61A, in the direction indicated by arrow "$H_1$". When a compartment 71 is moved over the opening 61A, the powder "P" that is in that compartment falls into the mixing tank 68 under the influence of gravity.

From the foregoing, it can be seen that the controller 48 controls the device 72C to cause a predetermined amount of the milk powder "P" to be moved into the mixing tank 68. The amount of the powder "P" that may be moved in each compartment respectively is known, and so the controller 48 therefore may determine how long the motor needs to be energized in order for the predetermined amount of powder to be provided in the mixing tank 68.

As can be seen in FIG. 5C, the chain subassembly 65 is formed so that, when plates are moving past a sprocket, and are proximal to a sprocket, the plates are positioned at an obtuse angle to each other, i.e., they are partly spaced apart from each other, and the compartment defined thereby is relatively large. Advantageously, when the plates are midway between the sprockets, the plates are parallel (or substantially parallel) to each other, and the compartment defined thereby is smaller.

The net result is that the volume of a compartment varies, depending on where the plates are in relation to the sprockets. In the example illustrated in FIG. 5B, for example, when the compartment 71A is proximal to the sprocket 73, it is relatively large, which means that it can accommodate the powder "P" falling into it, with minimal spillage outside the compartment 71A.

When the plates are between the sprockets, e.g., approximately midway between the sprockets, the plates are then positioned parallel or substantially parallel to each other, and the volume of the compartment is less than it was when the same plates were located proximal to the sprockets. In FIG. 5C, for example, a compartment identified by reference character 71B is shown generally midway between the sprockets. The compartment 71A is shown in the same location in FIG. 5C as it is in FIG. 5B. It can be seen in FIG. 5C that compartment 71B is substantially smaller than compartment 71A. Accordingly, as the chain subassembly 65 is driven by the sprockets, the shape and size of each of the respective compartments is varied between a larger configuration (i.e., when the compartment is at one of the sprockets) and a smaller configuration (i.e., when the compartment is midway between the sprockets).

As noted above, it is beneficial to have the compartment relatively larger when it is under the opening 61, because the risk of spillage of the powder that is moving into the compartment from the hopper 31C is decreased. However, it is also beneficial for the compartment to be relatively smaller when the compartment is located midway between the sprockets, because this consistently subjects the powder that is in the compartment to compression, when the powder therein is squeezed into a relatively smaller space. After such compression, the milk powder that is in the compartment is delivered to the mixing tank 68 via the opening 61A.

Those skilled in the art would appreciate that the milk powder is subject to agglomeration, depending on the humidity in the ambient atmosphere. As a practical matter, therefore, in the absence of a device for ensuring that the required amount of milk powder is delivered to the mixing tank 68 for a preparing a particular batch of the predetermined feed, the amount of milk powder that is delivered would vary.

From the foregoing, it can be seen that the chain subassembly 65 provides a consistent mass of the milk powder from each compartment thereof. That is, the chain subassembly 65 provides an accurately measured amount of the milk powder to the mixing tank 68. The consistency is achievable because each compartment, when in its smaller configuration, is the same size, and so the powder in each compartment that is in its smaller configuration is squeezed to the same extent by the plates, causing the milk powder in each compartment in the smaller configuration to be the same volume, and at approximately the same density. This is important, because (as noted above) the amount of milk powder that is moved into the mixing tank 68 is required to be the amount needed in order to provide the predetermined amount of the reconstituted milk in the predetermined feed. Accordingly, by controlling the activation of the motor that turns the sprocket 73, the controller 48 accurately controls the amount of the milk powder that is delivered from the hopper 31C to the mixing tank 68.

As described above, the recipients may be young animals, e.g., calves. The feeder unit 42 preferably includes the dispensing subassembly 34, for dispensing the predetermined feed to the recipient thereof. Those skilled in the art would appreciate that the dispensing unit 34 preferably is configured for dispensing the feed for the preselected animals that are at the feeding locations 24.

For instance, in one embodiment, the dispensing subassembly 34 preferably includes the one or more nipple elements 78 in fluid communication with the mixer subassembly 32. The nipple element 78 is configured to allow the predetermined feeds to flow therethrough, when the preselected recipient sucks on the nipple element 78. Those skilled in the art would appreciate that, if the animal does not suck on the nipple element 78, then the feed does not flow therethrough, and instead the feed remains on the weighing device "W". Those skilled in the art would appreciate that the nipple element 78 is formed for use by the recipient animal, e.g., if the recipient is a relatively young calf, then the nipple element 78 is formed accordingly.

Preferably, the feeder unit 42 includes a body subassembly 81 in which the mixer subassembly 32 and the milk powder tank subassembly 54 are located (FIGS. 2A-3). A tube may connect the weighing device "W" and the nipple element 78.

As can be seen in FIGS. 2A and 3, the dispensing subassembly 34 preferably includes the swing arm 80, on which the nipple element 78 is mounted. As will be described, the swing arm 80 permits the position of the nipple element 78 to be changed relative to a selected one of the feeding locations 24.

As can be seen in FIGS. 2A and 3, the swing arm 80 preferably is pivotably mounted to a lower end 83 of the body subassembly 81, for pivoting movement of the swing arm 80 relative to the body subassembly 81, as indicated by arrows "A" and "B" in FIG. 2A. It will be understood that the ability of the swing arm 80 to rotate at least 180° relative to the body subassembly 81 enables the feeder unit 42 to provide the predetermined feed to the feeding locations on opposite sides of the feeder unit. For example, as illustrated in FIG. 1A, the swing arm 80 is shown positioned to provide the feed to the preselected recipient 22A in the feeding location 24A.

Once the preselected recipient in the feeding location 24A has been fed, the swing arm 80 pivots approximately 180°, to feed the preselected recipient (not shown) in feeding location 24B. In FIG. 1A, for clarity of illustration, the swing arm located to feed the preselected recipient at the feeding location 24B is outlined in dashed lines, and identified by reference character 80'.

As can be seen in FIGS. 2A and 3, the dispensing subassembly 34 preferably includes a guard element 82. The guard element 82 is to protect other elements of the dispensing subassembly 34, as will be described. Preferably, the guard element 82 is pivotably mounted to the swing arm 80.

The guard element 82 is pivotable, as indicated by arrow "C", between raised and lowered positions. As illustrated in FIGS. 2A and 3, the guard element 82 is shown in the lowered position.

The dispensing subassembly 34 preferably also includes a compartment 86 for storage of a cleansing agent (FIG. 3), and means 88 for spraying the nipple element 78 after each of the preselected recipients has respectively fed from the nipple element 78 (FIGS. 2A, 3). Those skilled in the art would be aware of suitable cleansing agents.

As can be seen in FIGS. 2A and 3, the nozzles 88 preferably are mounted to the stop element 82, and positioned to spray the cleansing agent onto the nipple element 78. After the recipient has fed, the stop element 82 returns to its lowered position. At that point, the controller activates a pump (not shown) to pump a predetermined amount of the cleansing agent through the nozzles 88, onto the nipple element 78. Preferably, the spraying is completed before the nipple element 78 is in position to feed the next preselected recipient 22.

Those skilled in the art would appreciate that, on occasion, an animal may, when presented with the nipple element 78, aggressively thrust forwardly at it. The guard element 82 is intended to provide some protection to the nozzles 88, while allowing the animal to have access to the nipple element 78.

Preferably, the guard element 82 is biased to its lowered position, by any suitable means (e.g., a spring). It will be understood that the preselected recipient 22 (e.g., a calf) that approaches the nipple element 78 who first engages the guard element 82 with its nose (not shown) and pushes further toward the feeder unit 42 would tend to push the guard element 82 upwardly. In this way, the force exerted by the animal against the dispensing subassembly 34 may be absorbed or redirected, to an extent, with minimal harm to the animal and minimal damage to the dispensing subassembly 34.

In one embodiment, the dispensing subassembly 34 additionally includes a signal subassembly 84 for providing one or more signals to one of the preselected recipients to indicate availability of the nipple element 78.

The signals may be, for example, recorded sounds made by a mother cow to encourage a calf to feed, and/or recorded sounds of a calf when feeding. The signals may be broadcast from a speaker "S" mounted in the body subassembly 81 (FIG. 3). The generation of the signals is controlled by the controller 48. The signals preferably are generated when sufficient quantities of the feed components are in the liquid storage unit 44 and in the feeder unit 42, and the feeder unit 42 is in position for providing the predetermined feed to a preselected recipient 22 thereof at a feeding location 24.

Figure 4B:
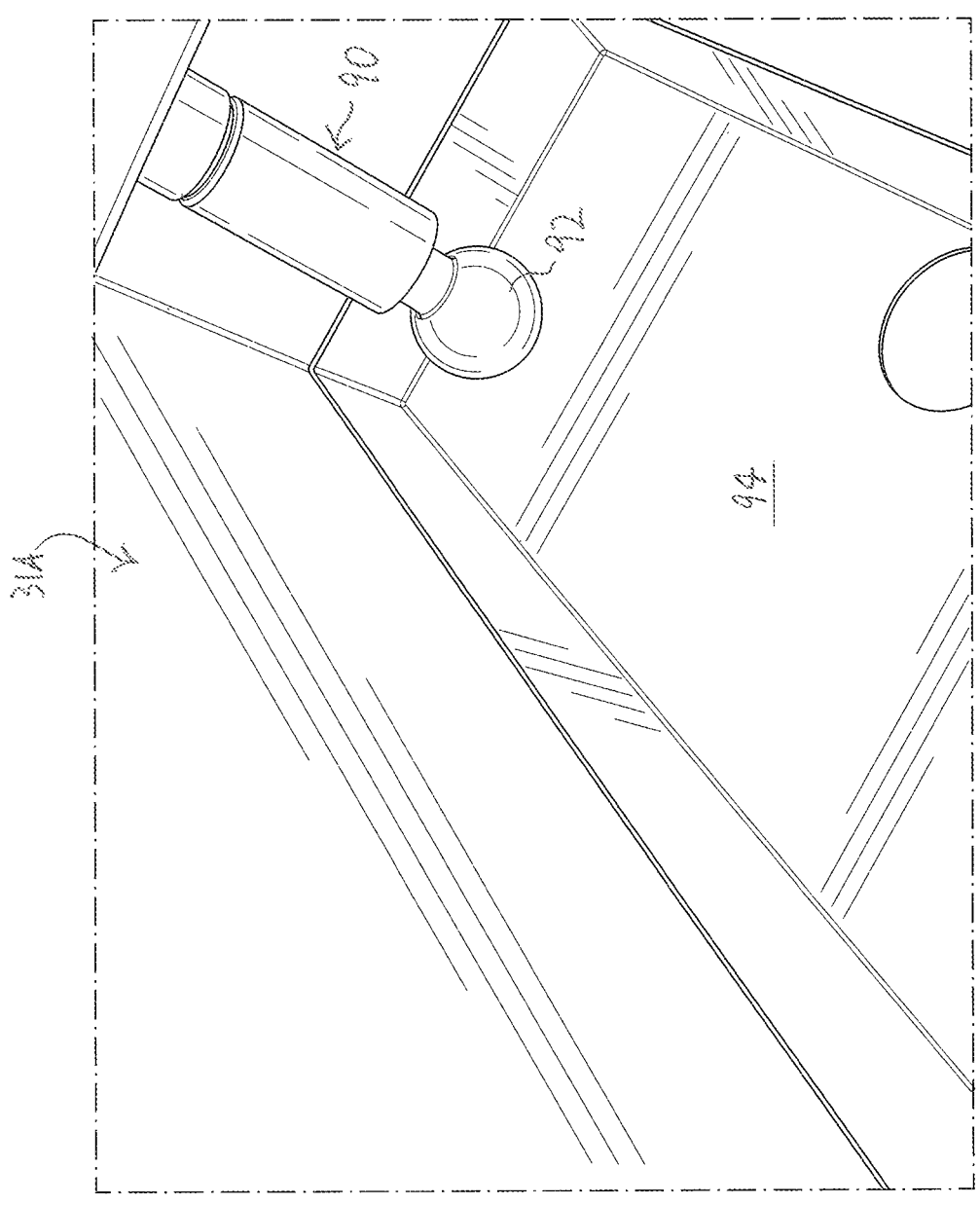
FIG. 4B is an isometric view of an interior of a milk tank in the warming tank subassembly of FIG. 4A, drawn at a larger scale.

Preferably, the whole milk tank subassembly 62 also includes a cleaning device 90 that is mounted for spraying a cleaning agent (not shown) inside the milk tank 31A (FIG. 4B). Those skilled in the art would appreciate that the tank 31A is required to be cleaned from time to time in accordance with applicable guidelines.

In one embodiment, the cleaning device 90 preferably includes a nozzle 92 (FIG. 4B) formed to direct the cleaning agent in a spray over all the interior surfaces 94 of the whole milk tank 31A. The cleaning agent may be pumped from a reservoir (not shown) located in the liquid storage unit 44 by a pump (not shown). The cleaning agent may be water, e.g., taken from the water tank 31B. Those skilled in the art would appreciate that the interior surfaces 94 preferably are sprayed with the cleaning agent when the tank 31A is empty of milk, on a regular schedule. The controller 48 may activate the cleaning device 90 at a suitable time, or the operator may manually activate the cleaning device.

Those skilled in the art would appreciate that the controller 48 may be located at any suitable location(s), and may be remotely located. However, in one embodiment, it is preferred that the controller 48 is located in the feeder unit 42. Preferably, the feeder unit 42 includes a number of manually operated switches 101 that may be operated by the operator if preferred, for manual override of certain functions (FIG. 2A). As can be seen in FIG. 3, it is also preferred that a display screen 103 operably connected with the controller 48 is mounted to the feeder unit 42, to facilitate the operator's control of the system 20.

Preferably, an emergency stop button 107 is mounted on the feeder unit 42 in a convenient location, readily available if needed (FIG. 3).

As noted above, there may be more than one of the preselected animals 22 at a particular feeding location 24. This situation is illustrated in FIGS. 6-9.

As can be seen in FIGS. 6-9, in an alternative embodiment of the dispensing subassembly 134 of the invention, the dispensing subassembly 134 preferably includes a number of nipple elements 178, e.g., one for each of the preselected recipients at a specific feeding location. Preferably, the dispensing subassembly 134 includes one or more feeder bars 196 on which are mounted a number of the nipple elements 178 in fluid communication with the mixer sub-assembly. As an example, the dispensing subassembly 134 that is illustrated includes two feeder bars, identified for clarity of illustration in FIG. 6 by reference characters 196A, 196B. Each of the feeder bars 196A, 196B includes four nipple elements 178 therein. Those skilled in the art would appreciate that the feeder bar have any suitable number of nipple elements mounted thereon.

Figure 7:
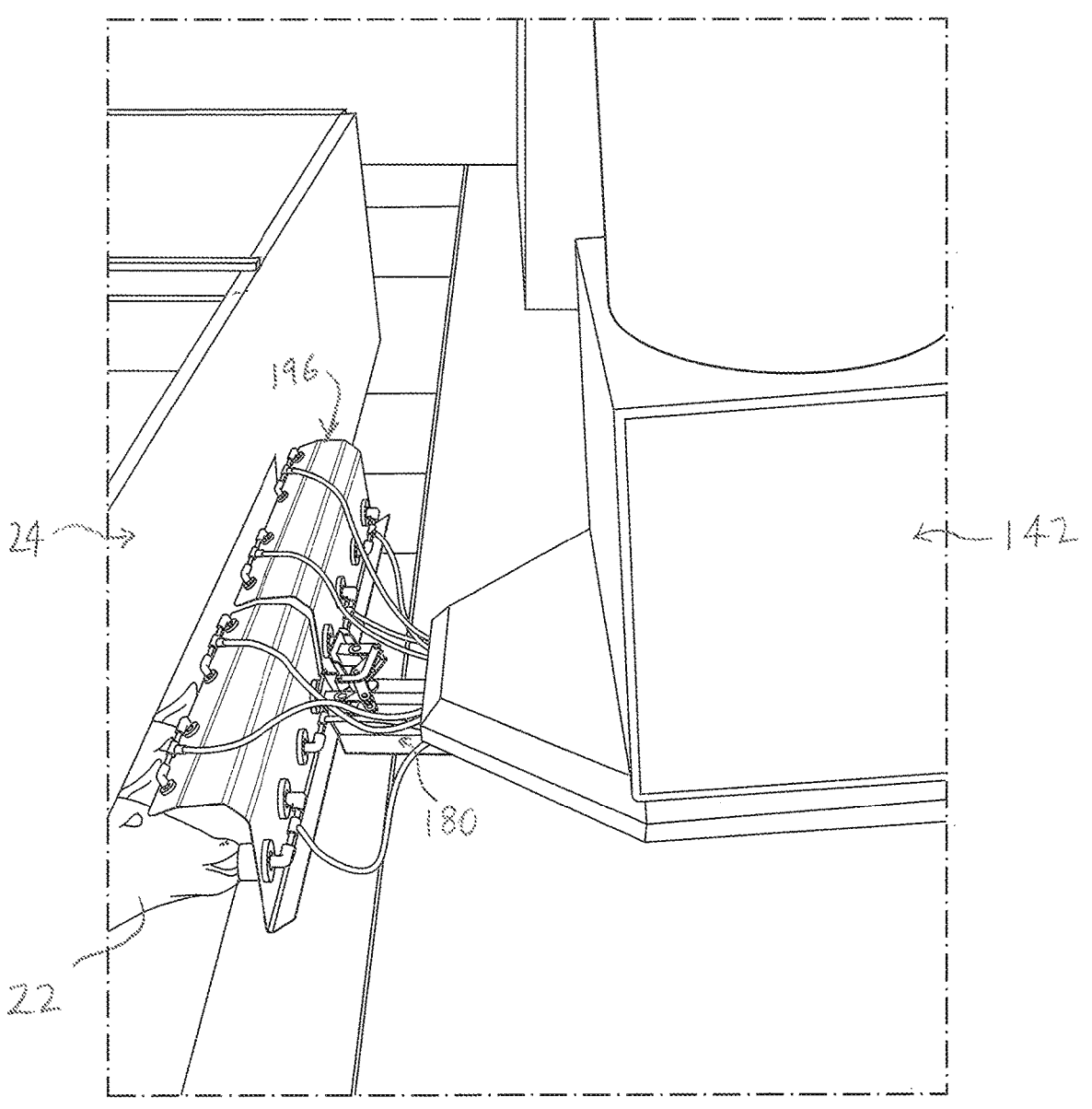
FIG. 7 is another isometric view of the feeder bar subassembly of FIG. 6.
Figure 8:
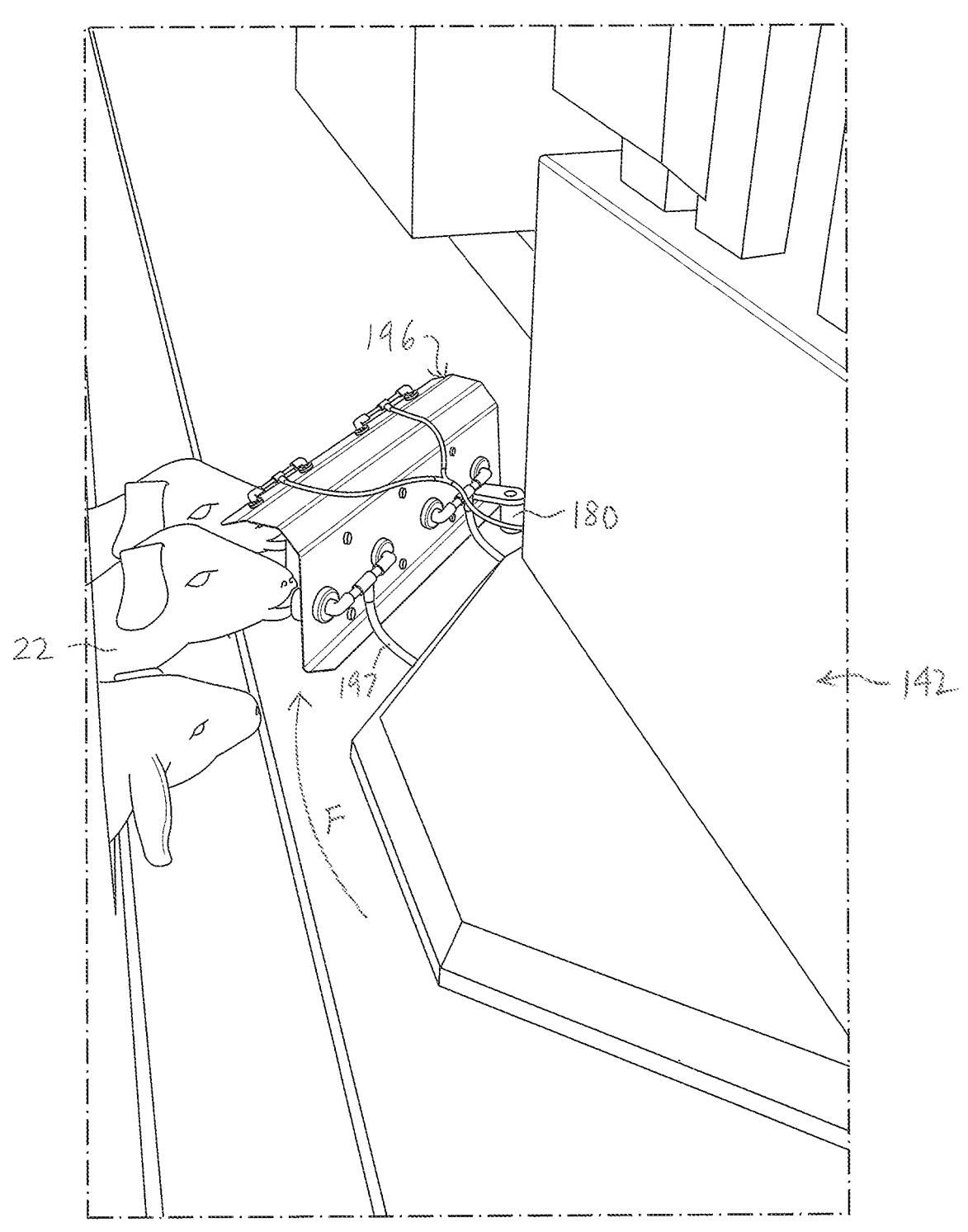
FIG. 8 is another isometric view of the feeder bar subassembly of FIG. 7 which is partially moved away from the animals.

The feeder bars 196A, 196B preferably are mounted to a swing arm 180, which is included in an embodiment of a feeder unit 142 of the invention (FIG. 7). Once the recipients at a feeding location 24 have been fed, the feeder bars 196 preferably are moved to the next feeding location, in a predetermined feeding sequence. Where the feeder unit is positioned at the next feeding location, the swing arm 180 preferably pivots toward a suitable position at the next feeding station. In FIG. 8, for example, the swing arm is moving in the direction indicated by arrow "F", to the next feeding station.

Figure 9:
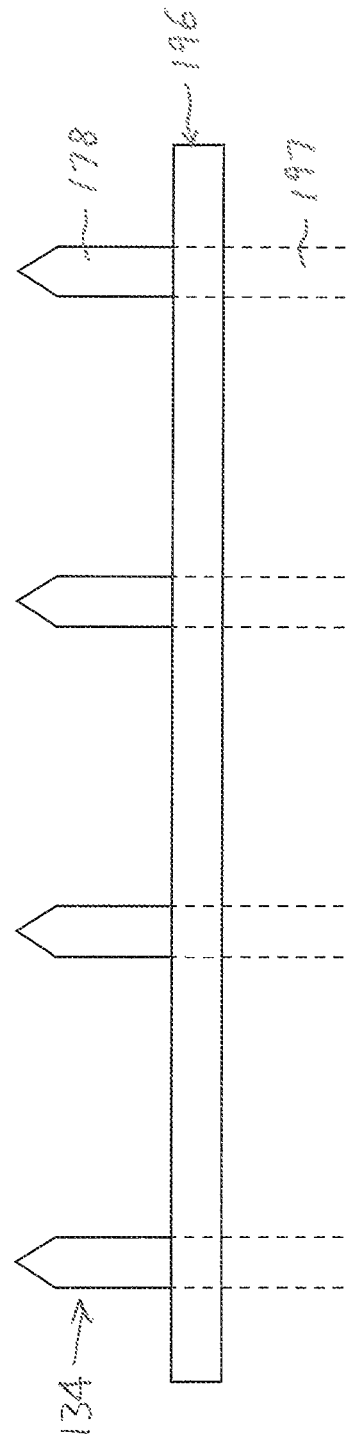
FIG. 9 is a schematic illustration of an embodiment of a feeder bar subassembly of the invention.

FIG. 9 is a schematic illustration of a single feeder bar. As can be seen in FIG. 9, the predetermined feed (not shown) preferably is pumped to the nipple elements 178 respectively via tubes 179.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A system (20) for distributing a plurality of predetermined amounts of predetermined feeds including at least one feed component to preselected recipients (22) thereof at a plurality of respective feeding locations (24), the system comprising:

a track assembly (26) comprising a track (28);

a feeder assembly (30) movable along the track (28), the feeder assembly (30) comprising a feeder unit (42) comprising:

a mixer subassembly (32) for preparing a preselected one or more of the feed components together to provide the predetermined amounts of the predetermined feeds;

a dispensing subassembly (34), configured to receive the predetermined feeds from the mixer subassembly (32) and to provide the predetermined feeds to the preselected recipients thereof, the dispensing subassembly comprising at least one nipple element in fluid communication with the mixer subassembly, said at least one nipple element being configured to allow the predetermined feeds to flow therethrough;

at least one tank (31A, 31B) for holding at least one of the feed components, configured to be in fluid communication with the mixer subassembly (32);

a feeder mounting assembly (36), for mounting the feeder assembly (30) to the track (28);

a motion assembly (38) for moving the feeder assembly (30) along the track (28) between a home location at which said at least one tank receives said at least one of the feed components, and the respective feeding locations;

a controller operatively connected with the feeder assembly and the motion assembly, for causing the feeder assembly to provide the predetermined feeds to the preselected recipients thereof respectively at the respective feeding locations, when the dispensing subassembly is located at the respective feeding locations;

the dispensing subassembly comprising a swing arm on which said at least one nipple element is mounted, for positioning said at least one nipple element for the preselected recipients thereof at a selected one of the feeding locations, wherein the feeder assembly provides the predetermined feeds in the predetermined amounts to the respective preselected recipients when the feeder assembly is at the respective feeding locations therefor;

the dispensing subassembly additionally comprising at least one nozzle (88) positioned for spraying a cleansing agent onto said at least one nipple element (78) after each of the preselected recipients have respectively fed from said at least one nipple element (78); and the dispensing subassembly additionally comprises a guard element (82) formed to protect at least one nozzle (88) from the preselected recipients, when said preselected recipients respectively thrust toward said at least one nipple element (78), said guard element (82) being pivotably mounted to the swing arm and biased to a lowered position, in which the guard element (82) is partially positioned between the preselected recipient and the nipple, and movable to a raised position, in which said at least one nipple element is accessible to the preselected recipient.

2. The system of according to claim 1 in which:

said at least one tank comprises a whole milk tank, a water tank subassembly comprising a water tank, and a milk powder tank, and the feed components comprise whole milk, water and milk powder, respectively receivable in the whole milk tank, the water tank, and the milk powder tank;

the water tank subassembly comprises at least one heating element therein, for heating the water in the water tank to a predetermined temperature range; and the water tank and the whole milk tank are formed for heat transfer from the water in the water tank to the whole milk in the whole milk tank, wherein the water at the predetermined water temperature maintains the whole milk in the whole milk tank at a preselected temperature range for the whole milk.

3. The system according to claim 2 additionally comprising:

a milk powder tank subassembly (54) comprising a milk powder hopper (31C) and a device (72C) for controlling movement of the milk powder from the milk powder hopper (31C) to a mixing tank (68)

the device (72C) comprising:

a panel (59) positioned below the milk powder hopper (31C), the panel (59) comprising an opening (61) therein positioned below the hopper (31C);

a chain subassembly (65) mounted to a drive sprocket (73) and an inner sprocket (73A) for movement around the sprockets; and a plurality of panels (67) mounted to the chain subassembly (65) to partially define respective compartments (71) therebetween for compression of the milk powder therebetween to provide a consistent mass of the milk powder delivered from each said compartment to the mixing tank (68).

4. The system according to claim 1 additionally comprising:

at least one bus bar, for providing electrical energy to the feeder assembly; and a pantograph (76), for electrically connecting said at least one bus bar with the feeder assembly (30) and the motion assembly (38).

5. The system according to claim 1 in which the dispensing subassembly additionally comprises a signal subassembly for providing at least one signal to a selected one of the preselected recipients at a feeding location (24) when the feeder unit (42) is in position at the feeding location to provide the predetermined amount of the predetermined feed via said at least one nipple element, signaling availability of said at least one nipple element, said at least one signal being selected from the group consisting of first recorded sounds of a mother cow to encourage a calf to feed and second recorded sounds of a calf while feeding.

6. The system according to claim 1 in which:

the controller is configured to make the predetermined feed available to a selected one of the preselected recipients at a selected one of the feeding locations for a predetermined feed time; and the controller comprises a timer that is activable when the feeder unit first makes the predetermined amount of the predetermined feeds available to the selected one of the preselected recipients at the selected feeding location, wherein the controller ceases to make the predetermined feeds available when the selected one of the preselected recipients has not consumed all the predetermined feed therefor in the predetermined feed time.

\* \* \* \* \*